United States Patent
Cuzzato et al.

(10) Patent No.: US 6,187,280 B1
(45) Date of Patent: Feb. 13, 2001

(54) PROCESS FOR THE PREPARATION OF ALUMINUM FLUORIDE

(75) Inventors: Paolo Cuzzato, Treviso; Letanzio Bragante; Francesco Rinaldi, both of Padova, all of (IT)

(73) Assignee: Ausimont S.p.A., Milan (IT)

( * ) Notice: Under 35 U.S.C. 154(b), the term of this patent shall be extended for 0 days.

(21) Appl. No.: 09/081,294

(22) Filed: May 20, 1998

(30) Foreign Application Priority Data

May 22, 1997 (IT) .............................. MI97A1195

(51) Int. Cl.⁷ .................. C01B 9/08; C01F 7/50
(52) U.S. Cl. .................. 423/489; 423/495; 502/231
(58) Field of Search .................. 423/489, 495; 502/231

(56) References Cited

U.S. PATENT DOCUMENTS

| | | | |
|---|---|---|---|
| 3,473,887 | * 10/1969 | Chu et al. | 423/495 |
| 3,836,635 | * 9/1974 | Reh et al. | 423/489 |
| 3,855,401 | * 12/1974 | Aiso et al. | 423/495 |
| 4,275,046 | * 6/1981 | McVicker et al. | 423/495 |
| 4,745,236 | 5/1988 | Azerad et al. | 570/166 |
| 4,967,023 | 10/1990 | Carmello et al. | 570/166 |
| 5,008,475 | 4/1991 | Manzer et al. | 570/168 |

FOREIGN PATENT DOCUMENTS

| | | | |
|---|---|---|---|
| 2103386 | * 1/1970 | (DE) | 423/489 |
| 0 285 324 | 10/1988 | (EP) . | |
| 1383927 | 11/1963 | (FR) . | |
| 1000485 | 2/1962 | (GB) . | |
| 902798 | * 8/1962 | (GB) | 423/489 |
| 1026131 | * 4/1966 | (GB) | 423/489 |
| 1 266 439 | 3/1972 | (GB) . | |
| 1290749 | * 9/1972 | (GB) | 423/489 |
| 2-116618 | * 5/1990 | (JP) | 423/489 |
| 97/10053 | * 3/1997 | (WO) | 423/489 |

OTHER PUBLICATIONS

Hao et al. "Catalyst for the fluorination of halogenated hydrocarbon(s) has an active aluminium fluoride support with high relative surface area and pore vol. and has improved selectivity and reeactivity at low temps.", Mar. 20, 1997.

* cited by examiner

Primary Examiner—Ngoc-Yen Nguyen
(74) Attorney, Agent, or Firm—Arent Fox Kintner Plotkin Kahn

(57) ABSTRACT

Process for preparing aluminum fluoride having an high surface area and high pore volume comprising the fluorination with HF of alumina having surface area of at least 150 $m^2/g$ and pore volume not lower than 0.3 cc/g, said alumina comprising from about 0.5 up to about 15% by weight of silicon oxide.

2 Claims, No Drawings

PROCESS FOR THE PREPARATION OF ALUMINUM FLUORIDE

The present invention relates to a process for preparing aluminum fluoride and the so obtained aluminum fluoride.

In particular the invention relates to an improved process for preparing aluminum fluoride starting from the corresponding oxide.

The aluminum fluoride ($AlF_3$) is an inorganic solid well known in the art of the preparation of heterogeneous catalysts. It is used both as such and as support for metal salts and shows catalytic activity due to its strong acidity according to Lewis and/or its thermal and chemical inertia. It is widely used, for instance, in the fluorination of chlorinated organic compounds to obtain the corresponding fluorinated compounds; in this case it is used also as a support of chromium, cobalt, nickel salts, etc. See for instance U.S. Pat No. 4,967,023 and U.S. Pat. No. 5,008,475.

The preparation, in industrial scale, of aluminum fluoride is carried out by fluorination of the aluminum oxide (alumina) with anhydrous hydrofluoric acid (HF). Other methods are also known which however have substantially a laboratory application, such as the pyrolysis of hexafluoroaluminates; the treatment of alumina with chlorofluorinated organic compounds; the F/X exchange on an aluminum halide wherein X is equal to Cl, Br, et.

In the case of alumina fluorination the amount of fluorine content depends on the reaction conditions and can be also much lower than the stoichiometric.

The alumina fluorination with anhydrous HF to obtain $AlF_3$ is well known in the art and is described for instance in FR 1,383,927, wherein the so obtained $AlF_3$ is then used as such to catalyse the HF sum on acetylene.

As it is well known to the skilled in the catalyst preparation, it is desirable that a solid which must be used as heterogeneous catalyst, both as such, and as a support for a catalytically active phase, has a surface area (SA) and a pore volume (Vp) as high as possible. Typical examples of solid used to this purpose are the various kinds of alumina having surface areas of 200–300 $m^2/g$ and pore volumes around 0.5 cc/g.

However the alumina fluorination to obtain $AlF_3$ drastically reduces said parameter values: the obtained $AlF_3$ shows indeed low SA and low Vp. To try to increase these values it is well known to limit the fluorination well below the stoichiometric.

This process of course cannot be applied to the fluorination catalysts, since the HF used as reactant would lead to completion the fluorination of the alumina, with consequent loss of surface area and of catalytic activity.

In order to overcome this drawback, it has been suggested, see GB 1,000,485, to regenerate the alumina when it overfluorinated by steam treatment at high temperature. Such process is of course not very practical in industrial scale, especially for the great aggressiveness of the gaseous mixture of HF and water at high temperature which is thus produced. A further drawback is in that these kinds of catalyst require frequent regenerations and therefore the interruption of the production processes where they are used.

SUMMARY OF THE INVENTION

It has been now surprisingly and unexpectedly found by the Applicant that it is possible to obtain $AlF_3$ with high surface area and high pore volume, by fluorination of alumina with anhydrous HF by using the process described hereinafter.

It is therefore an object of the present invention a process for preparing aluminum fluoride having an high surface area and high pore volume comprising the fluorination with gaseous HF of alumina having surface area of at least 150 $m^2/g$ and pore volume not lower than 0.3 cc/g, said alumina comprising from about 0.5 up to about 15% by weight of silicon oxide, preferably from 1 to 10% by weight, more preferably from 1.5 to 6% by weight.

DESCRIPTION OF THE PREFERRED EMBODIMENTS

As aluminum fluoride, according to the present invention, it is meant the alumina fluorination product, having a fluorine content not lower than 90%, preferably not lower than 95%, of the stoichiometric.

The $AlF_3$ obtained with the process of the invention maintains its characteristics of high surface area and of high pore volume also during its use in fluorination and therefore it does not require frequent regeneration processes.

The $AlF_3$ obtainable with the process of the invention has been found to maintain a fraction of the surface area of the starting alumina which is also the double of that obtainable starting from alumina not containing silica. Likewise the maintained fraction of the pore volume results higher when alumina containing silica according to the present invention is used.

The $AlF_3$ obtainable with the process of the invention has generally a surface area not lower than 25 $m^2/g$, preferably not lower than 30 $m^2/g$ and a pore volume not lower than 0.20 cc/g, preferably 0.25 cc/g.

The fluorination conditions of alumina containing silica are not particularly critical. One generally operates at a temperature comprised between about 250° C. and about 450° C., preferably higher than 300°–400° C. Indeed if one operates at temperatures lower than those indicated, the fluorination is too slow.

The total pressure has no relevant effects and one generally operates at atmospheric pressure or slightly higher, generally of some atmospheres.

It is advantageous that the partial pressure of HF is low, especially at the beginning of the fluorination, to moderate the heat development which could locally increase the temperature over the above limits: indeed two highly exothermic phenomena contemporaneously occur: the reaction between HF and alumina with formation of $AlF_3$ and water and the hydration of the unreacted HF from the latter.

To moderate these exothermic effects it is sufficient to use HF diluted with a gas inert in the fluorination conditions, for instance, air or nitrogen; the partial pressure of HF is generally comprised between 0.1 and 0.50.

A better control of the temperature is possible also by carrying out the reaction in fluidized bed and this is the preferred way to carry out the fluorination. In this case the aluminas to be fluorinated have a granulometry compatible with the use of fluidized beds.

In general the alumina which is used according to the present invention contains less than 0.1% by weight (each) of undesirable contaminants in the final product $AlF_3$ such as: iron, sulphates, sodium.

If aluminas are in hydrated form, it is preferable to subject the aluminas to a calcination phase in air or nitrogen, at a temperature comprised between 300° C. and 400° C., before the fluorination step. This limits the development of water during the reaction, which is undesirable especially because it favours the equipment corrosion.

The aluminas containing silica are prepared with known methods in the art, for instance by spray-drying of suitable precursors.

The aluminas containing silica which are preferably used according to the present invention are for instance commercial products of Condea Chemie (Germany).

Aluminas, aluminas containing silica and aluminum fluorides are characterized by techniques well known to the skilled in the art of the solid characterization: the surface area (SA) is measured by nitrogen adsorption according to the BET method; the pore volume is measured by mercury injection at high pressure; the crystalline phases by X ray diffraction; the constituent analyses are carried out by wet way according to known methods, or by X ray fluorescence by comparison with standards prepared on the same matrix by calibrated additions.

$AlF_3$ obtained according to the process of the present invention generally is mainly formed by gamma phase as described in FR 1,383,927.

Some examples are reported for illustrative purposes, the variations which can be introduced without deviating from the scope of the invention are easily accessible to the skilled in the art.

EXAMPLE 1 (COMPARATIVE)

Use of an Alumina Free From Silica

A sample of an alumina free from silica (commercial product CONDEA PURAL® SCC-10) is calcined in air flow at 360° C.; after the calcination it results to have:

SA=275 $m^2/g$
Vp=0.402 $cm^3/g$ crystalline structure: pseudo-bohemite. 370 g of this alumina are introduced in an Inconel 600® tubular reactor, having a 50 mm diameter, electrically heated and equipped with porous septum at the base, and fluorinated at 360° C. with an air/HF mixture for 30 hours at the temperature of 360° C.; at steady conditions the mixture composition is 0.85 mole/h of HF, 4 mole of air.

The reactor is cooled under air flow and about 510 g of aluminum fluoride are discharged having the following characteristics:

SA=19.8 $m^2/g$
Vp=0.19 $cm^3/g$ crystalline structure: $\gamma$-$AlF_3$

EXAMPLE 2

Use of an Alumina CONDEA SIRAL® 1.5 Containing 1.5% of Silica

An alumina containing 1.5% of silica (% by weight of the anhydrous product) is calcined and characterized as described in the preceding Example. It results to have:

SA=305 $m^2/g$
Vp=0.442 $cm^3/g$
DRX: pseudo-bohemite.

370 g of this alumina are fluorinated as described in the preceding Example: about 510 g of $AlF_3$ are obtained with the following characteristics:

SA=34.5 $m^2/g$
VP=0.26 $cm^3/g$
crytalline structure: $\gamma$-$AlF_3$ with a little of $\alpha$-$AlF_3$.

EXAMPLE 3

Use of an Alumina CONDEA SIRAL® 5 Containing 5.4% of Silica

After calcination the alumina results to have:
SA=295 $m^2/g$
Vp=0.499 $cm^3/g$
DRX: pseudo-bohemite.

370 g of this alumina are fluorinated as described in the preceding Example: about 530 g of $AlF_3$ are obtained with the following characteristics:

SA=43.0 $m^2/g$
Vp=0.35 $cm^3/g$
crystalline structure: $\gamma$-$ALF_3$ with a little of $\alpha$- and $\beta$-$AlF_3$.

It is evident in Examples 2 and 3, the increase of SA and Vp with respect to the comparative Example, although the starting aluminas differed not very much from each other in the chemical-physical characteristics.

From the comparison of the Examples it can be noted that both the surface area and the pore volume of the obtained $AlF_3$ are always higher when an alumina containing silica according to the present invention is used.

What is claimed is:

1. A process for preparing aluminum fluoride having an essentially gamma crystalline structure, a surface area of at least 25 $m^2/g$, a pore volume higher than 0.20 $cm^3/g$ as determined by mercury injection at high pressure, and a fluorine content of at least 95% by weight of the stoichiometric value of fluorine in aluminum fluoride, the process comprising fluorinating alumina with gaseous HF at a temperature higherthan 300° to 400° C., wherein the gaseous HF is diluted with an inert gas and has a partial pressure of between 0.1 and 0.5, and wherein the alumina has a surface area of at least 150 $m^2/g$ and comprises from 1 to 10% by weight of silicon oxide.

2. The process of claim 1, wherein the inert gas is air or nitrogen gas.

* * * * *